Figure 1:
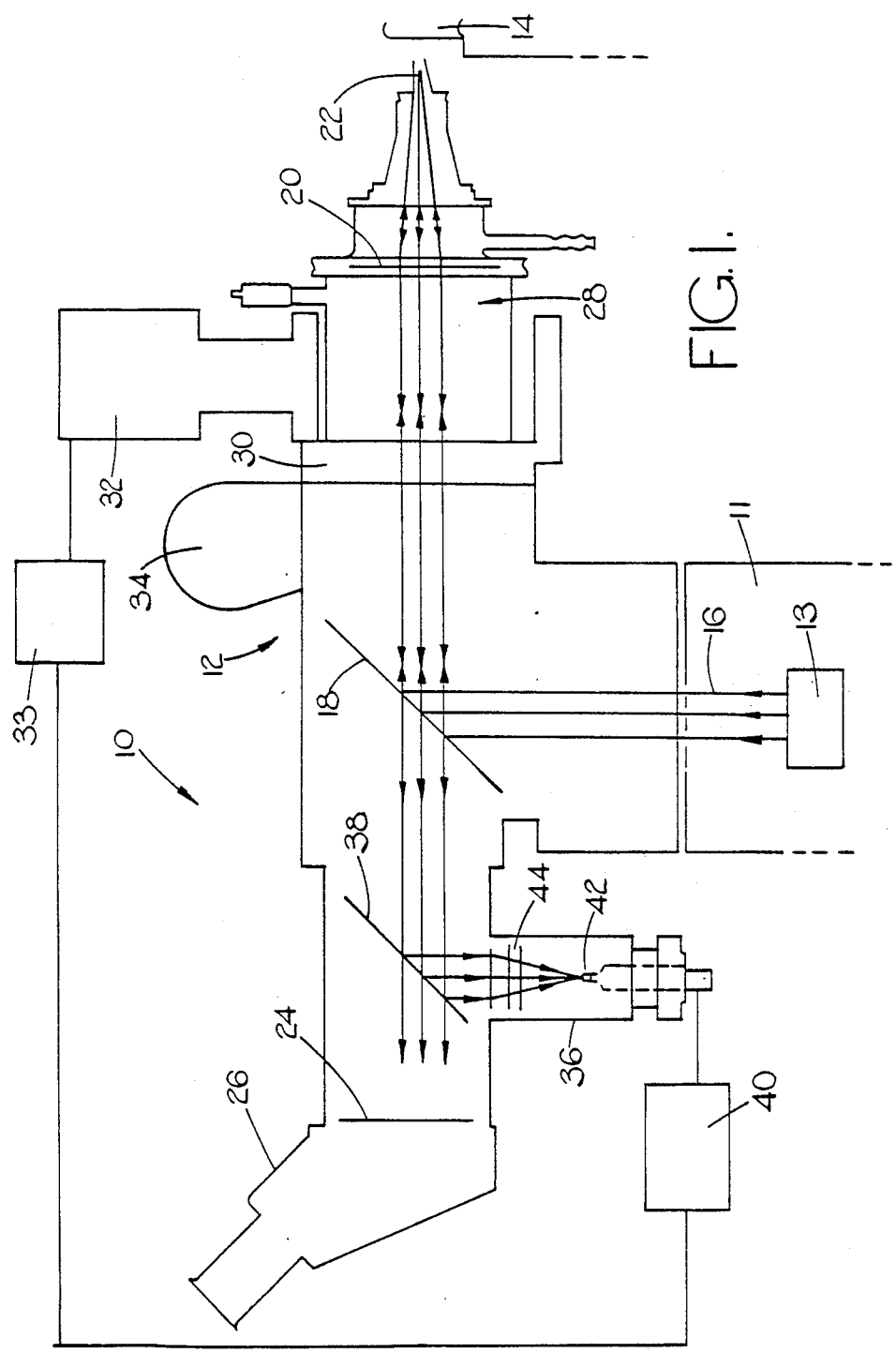

United States Patent [19]

Jones

[11] Patent Number: 4,633,058
[45] Date of Patent: Dec. 30, 1986

[54] LASER MACHINING APPARATUS
[75] Inventor: Godfrey D. Jones, Syston, England
[73] Assignee: Preci-Spark Limited, England
[21] Appl. No.: 459,470
[22] Filed: Jan. 20, 1983
[30] Foreign Application Priority Data Jan. 21, 1982 [GB] United Kingdom ............... 8201739

[51] Int. Cl.⁴ ............................................. B23K 26/00
[52] U.S. Cl. ....................... 219/121 LK; 219/121 LR; 219/121 LU; 219/121 LV
[58] Field of Search ................. 219/121 LK, 121 LL, 219/121 LA, 121 LB, 121 LP, 121 LQ, 121 LR, 121 LU, 121 LV, 121 LX, 121 LY; 131/281; 350/6.8

[56] References Cited

U.S. PATENT DOCUMENTS

| | | |
|---|---|---|
| 3,226,527 | 12/1965 | Harding .................... 219/121 LV X |
| 3,576,965 | 5/1971 | Gugger .................... 219/121 LL X |
| 3,594,532 | 7/1971 | Lunau ..................... 219/121 LV X |
| 3,619,550 | 11/1971 | Mathews ................... 219/121 LU X |
| 3,689,159 | 9/1972 | Taniguchi et al. ......... 219/121 LX X |
| 3,700,850 | 10/1972 | Lumley ................... 219/121 LM |
| 4,110,594 | 8/1978 | May ....................... 219/121 LY |
| 4,118,619 | 10/1978 | McArthur et al. ......... 219/121 LU X |
| 4,338,508 | 7/1982 | Jones et al. ............. 219/121 LX X |
| 4,346,284 | 8/1982 | Grollimund et al. ....... 219/121 LK |
| 4,378,480 | 3/1983 | Langhans ................. 219/121 LK |
| 4,461,947 | 7/1984 | Ward ..................... 219/121 LC X |

FOREIGN PATENT DOCUMENTS

| | | | |
|---|---|---|---|
| 0102695 | 8/1979 | Japan ........................... 219/121 LX |
| 2022492 | 12/1979 | United Kingdom .......... 219/121 LL |
| 2027628 | 2/1980 | United Kingdom .......... 219/121 LL |

Primary Examiner—M. H. Paschall
Attorney, Agent, or Firm—Frijouf, Rust & Pyle

[57] ABSTRACT

A laser machining apparatus (1) for burning holes in a workpiece has an objective lens (20) which is movable in a plane generally perpendicular to the lens axis to enable the laser beam to be moved and focused at different surface locations on the workpiece (14). This enable clusters of holes to be machined in the workpiece surface without the necessity of moving the workpiece except, perhaps, for horizontal movement which is normally a rotational indexing of the workpiece, the laser beam being horizontally directed. Detection of burn-through of the beam is effected by an optoelectronic detector circuit which monitors the light intensity transmitted from the workpiece surface during burning of a hole by the laser, the light being transmitted back along the laser beam path through a mirror and filter system (18, 38, 44) to the detector circuit. Once burn-through is effected the fall in light intensity is detected by the circuit which triggers movement of either the beam or workpiece or both.

12 Claims, 2 Drawing Figures

LASER MACHINING APPARATUS

The present invention relates to apparatus for machining holes in workpieces.

Lasers are sometimes used in the precision drilling of small holes of typically 1 mm diameter in metal workpieces used, for example, in the aircraft industry. One such type of workpiece is a metal cylinder or ring of about 122 cm diameter in which typically 4000 through-holes are required to be drilled. When a laser is used, the ring is automatically indexed to bring a hole location into position beneath the laser beam which is focussed on the ring to drill or "burn" a hole through the ring. The laser is then moved along a preselected path to burn out the desired hole shape. For a circular hole the laser is moved through a generally circular path. The process is repeated for each hole.

When drilling a cluster of holes in the radially outer surface of the ring, the laser is positioned so that its beam is projected horizontally while the cylinder or ring is indexed about its substantially vertical axis. After each indexed step of the ring the latter is also moved both horizontally and vertically in a plane substantially parallel with the ring axis to enable the cluster of holes to be drilled. A disadvantage of this operation is that the apparatus for moving the ring in the vertical plane must be capable of operating with large, heavy workpieces.

The energy generated by a laser is generally very much temperature dependent and a change of a few degrees in ambient temperature can cause considerable energy variations in the laser beam which in turn results in wide variations, typically 0.5 to 5 seconds, in the "burn-through" time, i.e. the time the laser beam takes to burn the initial hole through the workpiece. Normally the laser is fitted with a timer which maintains the laser beam stationary for a preset time period to allow burn-through before movement of the beam is commenced to burn out the final hole shape. As will be appreciated, if the time delay is insufficient to compensate for ambient temperature changes laser movement will in some instances commence before burn-through is completed, leaving some holes unfinished while a long time delay will considerably extend the operation time. Where 4000 holes are to be burned in a workpiece the total operation time can be extended by as much as several hours.

The present invention seeks to provide an improved laser machining apparatus.

Accordingly, the present invention provides a method for burning a cluster of holes in a workpiece comprising the steps of:
(a) directing and focussing a laser beam at a preselected location on said workpiece for burning a hole therein;
(b) subsequently redirecting the beam to a second preselected location on said workpiece for burning a second hole therein; and
(c) repeating step (b) n times where n is an integer greater than or equal to 0.

The present invention also provides a laser machining apparatus comprises an optical system for transmitting and focussing a laser beam to and at a preselected location on a workpiece for burning a hole therethrough means for adjusting said optical system for altering the direction of the transmitted beam and means for activating said adjusting means to redirect said beam in a preset manner.

In a preferred embodiment of the invention a cluster of holes is burned in a workpiece by first directing the laser beam at the first preselected location on the workpiece, then redirecting the beam as required to burn the remaining holes at their preselected locations, after which the workpiece is indexed to bring a further surface portion of the workpiece into register with the laser beam which is then moved over the surface portion to burn a further cluster of holes in the surface.

Preferably, the actuating means comprises a microcomputer coupled to said adjusting means by a drive circuit, the microcomputer being operable to actuate the adjusting means after a preselected time to redirect the laser beam. The adjusting means conveniently comprises a stepped motor.

Advantageously the optical system comprises a focus lens having support means movable in a plane substantially perpendicular to the lens axis and coupled to the adjusting means.

Preferably, in burning through-holes in a workpiece, a photoelectric sensor is used to detect the light generated as the laser burns through the metal of the workpiece, the light being transmitted back along part of the laser path and diverted to the sensor. During burn-through a considerable amount of light is generated, this, however, decreasing markedly on burnthrough and this change in light level is used to trigger redirection of the laser.

Figure 2:
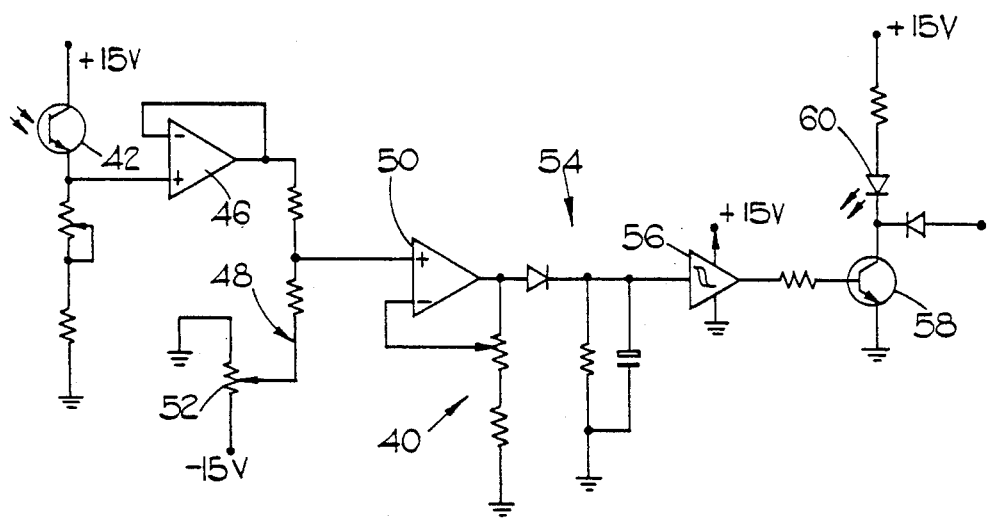

The present invention is further described hereinafter, by way of example, with reference to the accompanying drawings in which:

FIG. 1 is a diagrammatic side elevational view of an apparatus according to the present invention; and FIG. 2 is a circuit diagram of a detector circuit of the apparatus of FIG. 1.

Referring to the drawings, the apparatus 10 has a base member 11 supporting an optical system 12 which focusses a laser beam at preselected locations on the surface of a workpiece 14 located in the beam path. A collimated beam of laser light from a pulsed YAG laser 13 is transmitted to the optical system 12, entering the system as seen in FIG. 1. Beam 16 is reflected by a partially reflective surface 18, typically a semi-reflective mirror or the like, through an angle of 90° into a horizontal path. The laser beam is then focussed by an objective lens 20 through a gas nozzle 22 onto the workpiece surface. Visible light and laser light reflected from the workpiece surface is transmitted back along the beam path, through the semi-reflective mirror 18 and a laser filter 24 into a prismatic binocular viewing system 26. The laser filter 24 filters out any residual laser light.

The objective lens 20 is carried by one of two coplanar tables 28 and 30, the one table 28 being supported by the second table 30 which in turn is mounted on a housing of the apparatus by means of miniature precision re-circulating ball leadscrews and linear roller bearings to allow linear reciprocation of the two tables along respective axes at right angles to one another in a plane substantially perpendicular to the beam and lens axis. Movement of each table is controlled by a respective precision DC servomotor 32 and 34. Control of the two motors 32, 34 to move the tables 28 and 30 at preselected speeds and in preselected directions enables the objective lens 20 and thus the focussed laser beam to be moved at any preselected speed along any preselected path.

In operation, the workpiece 14 is indexed to bring a preselected surface location into position on the optical system axis and the laser beam is then focussed to burn a hole through the workpiece. Although the laser beam can be directed either vertically or horizontally or at any preselected angle to the horizontal the apparatus is shown in FIG. 1 in a horizontal attitude providing a horizontal beam for machining a generally upstanding surface of the workpiece. In order to machine a cluster of holes in the adjacent surface portion of the workpiece the motors 32 and 34 are controlled to move the objective lens 20 and thus the laser beam along a preselected path, at various locations on which, in accordance with a preselected pattern, beam movement is stopped and further holes burned in the workpiece. Movement of the laser beam rather than the workpiece means that only horizontal movement, typically rotational indexing, of the workpiece need be effected, thus avoiding the necessity for vertical movement of the workpiece.

An opto-electronic detector circuit may be provided to trigger actuation of the motors 32 and 34. The detector circuit senses when burn-through is completed and then actuates the motors 32, 34 to carry out their preprogrammed operation. The circuit 40 includes a sensor in the form of a photo-transistor 42 located in a lateral extension 36 of the apparatus housing. A partially reflective surface in the form of a semi-reflective mirror 38 or the like is positioned between the mirror 18 and laser filter 24 in the path of the light transmitted to the prismatic binocular viewing system 26 to reflect some of this light towards the photo-transistor 42. Suitable laser filters 44 remove any residual laser light so that the photo-transistor 42 is responsive only to the visible light transmitted from the workpiece surface. The photo-transistor 42 is coupled, preferably through a co-axial lead, to the remainder of the circuit which is conveniently located remote from the transistor. In response to incident light the photo-transistor 42 generates a signal which is amplified through an operational amplifier 46. The output of the operational amplifier is coupled through a null bias resistor chain 48 to a further operational amplifier 50. The null bias resistor chain includes a variable resistor 52 which allows fine adjustment of the circuit to be made to compensate for the effects of any residual laser light which might reach the photo-transistor 42. The output of the operational amplifier 50 is rectified and filtered by a filter circuit 54, this being desirable when a pulsed laser is used, and applied to a trigger circuit 56, preferably a Schmitt trigger, to provide a clear switched signal. A transistor 58 is driven by the trigger 56 and drives an indicator e.g. a light-emitting diode 60, the collector of the transistor 58 also servings as the output of the circuit.

In operation, the action of the laser on the workpiece metal as a hole is burned through the workpiece generates a considerable amount of visible light which is transmitted back along the laser path and through the mirror 18, part of this light being reflected by the mirror 38 to the photo-transistor 42. The latter, in response to incident light, generates a signal which is amplified by the amplifiers 46 and 50 and applied to the Schmitt trigger 56. On completion of burn-through the amount of visible light generated at the workpiece surface drops rapidly and this sudden decrease in visible light incident on the photo-transistor 42 switches the Schmitt trigger 56 to provide an output signal, triggering actuation of the motors 32 and 34 to commence movement of the laser beam. The null bias resistor chain 48 is set to provide a zero voltage after burn-through at the input of the amplifier 50 so that on burn-through the output of the transistor 58 drops from a relatively high voltage to a voltage of between a few millivolts and 0.5 volts. The turning on of the transistor 58 also energised the light-emitting diode 60.

A control circuit 33 such as a microcomputer is used to control the motors 32 and 34 in a preprogrammed manner to move the laser beam along the preselected path for burning of a cluster of holes. In addition, where holes of preselected shapes are required, after burn-through of a hole the microcomputer actuates the motors 32 and 34 either after a preselected time interval or in response to a signal from the detector circuit, to move the beam in a preselected manner and burn the hole in the desired shape. The beam is then moved along the path to the next hole location or the workpiece is indexed to bring the next workpiece surface portion into register with the laser beam. Both movements can, of course, be combined.

Where the workpiece being machined is, for example circular, it is possible for slight eccentricities to exist. A transducer may therefore be used to detect any such eccentricity and control the indexing of the ring accordingly to ensure that the holes machined by the laser are correctly positioned.

Although reference is made to the burning of a through-hole it will be appreciated that the apparatus may be used to machine any shape of recess generally.

I claim:

1. A method for burning a plurality of holes in a workpiece with a laser beam focused through a lens means having an axis substantially parallel to the laser beam, the lens means being supported by a first member and a second member wherein the first member is movable in a first direction substantially perpendicular to the axis of the laser beam and wherein the second member is movable in a first direction in accordance with the movement of the first member and the second member is movable in a second direction at a right angle to a direction substantially perpendicular to the axis of the laser beam, comprising of the steps of:

aligning the lens means axis with the work piece such that the axis is substantially normal to the surface of the work piece;

directing a prefocused laser beam through the lens means such that the prefocused laser beam extends substantially parallel to the lens means axis;

focusing the perfocused laser beam to a focal point adjacent the workpiece with a focusing lens;

moving the focusing lens in the first direction and second direction by adjustment of the first and second members, respectively to direct the focal point to a first preselected location for burning a first hole through the work piece; and moving the focusing lens in a first direction and second direction by adjustment of the first and second members, respectively to direct the focal point to a second preselected location for burning a second hole through the work piece without moving the prefocused laser beam relative the work piece.

2. A laser apparatus for machining a cluster of holes in a workpiece by means of a beam of laser light generated by a laser light source, said apparatus comprising:

a base member;

a lens means supported on said base member for transmitting the beam of laser light to a preselected location on the workpiece;

said lens means including a focussing lens for focussing a prefocused beam of laser light to provide a focussed beam of laser light on the workpiece and a supporting means for supporting said focussing lens;

said supporting means being moveable in a first direction consisting of a plane substantially perpendicular to an axis of said focussing lens and including a first and second member;

said first member movably supporting said second member for moving said second member in said first direction;

said second member movably supporting said focussing lens for moving said focussing lens in a second direction consisting of a right angle to said first direction;

said movement of said first member in said first direction being substantially perpendicular to the movement of said second member in said second direction to direct said focussed beam of laser light at a first preselected location for burning a first hole in the workpiece at said first preselected location;

means for moving said first and second member in said first and second directions for moving said focussing lens thereby redirecting the focussed beam of laser light at a second preselected location for burning a hole at said second preselected location on the workpiece without moving said prefocused beam of laser light relative the workpiece in order to burn a cluster of holes in the workpiece.

3. Method as claimed in claim 2 further comprising monitoring the intensity of light generated at said location during the burning of the hole by the laser, comparing said light intensity with a preselected value and controlling the direction of said laser beam in dependence on the comparisons.

4. A method as claimed in claim 3 further including the step of:
moving the beam along a preselected path to burn said hole in a preselected shape prior to the step of moving the lens for redirecting the beam to the second location on the workpiece for burning the second hole therein.

5. The laser apparatus of claim 2 including a means for adjusting said focussing lens for altering the direction of said focussed beam of laser light and means for actuating said adjusting means to redirect said focussed beam of laser light in a preset manner.

6. Apparatus as claimed in claim 5, wherein said actuating means comprises a microcomputer, a drive circuit coupling said microcomputer to said adjusting means, said microcomputer being operable to actuate said adjusting means after a perselected time to redirect said beam.

7. Apparatus as claimed in claim 6 wherein said microcomputer is operable to actuate said adjusting means to move said focus beam of laser light along a preselected path for burning the hole in a preselected shape.

8. Apparatus as claimed in claim 5 wherein said adjusting means comprises a stepped motor.

9. The laser apparatus of claim 5 wherein said support means is coupled to said adjusting means.

10. The laser apparatus of claim 9 including a means for monitoring the intensity of light at said location and controlling said adjusting means in dependence thereon for redirecting said focussed beam of laser light in a preset manner to enable the focussing lens and focussed beam of laser light to be moved at any preselected speed along any preselected path on the workpiece for burning a hole therein and to insure complete burn-through of the laser burned hole.

11. Apparatus as claimed in claim 10 wherein said monitoring means is operable to monitor the light intensity generated during burning of the hole by the laser, compare said light intensity with a preselected value and trigger actuation of said adjustment means for redirecting said beam.

12. Apparatus as claimed in claim 11 wherein said monitoring means triggers said actuating means responsively to said light intensity falling below said preselected value.

* * * * *